(12) United States Patent
Chan et al.

(10) Patent No.: US 8,905,272 B2
(45) Date of Patent: Dec. 9, 2014

(54) SEALED DISPENSER FOR METERED FLUENT MATERIALS

(75) Inventors: Edwin Chan, Brooklyn, NY (US);
Blaine R. Bruner, Kettering, OH (US);
William M. Sherk, Jr., Dayton, OH (US)

(73) Assignee: Birost LLC, Dayton, OH (US)

( * ) Notice: Subject to any disclaimer, the term of this patent is extended or adjusted under 35 U.S.C. 154(b) by 805 days.

(21) Appl. No.: 12/939,676

(22) Filed: Nov. 4, 2010

(65) Prior Publication Data

US 2011/0101023 A1    May 5, 2011

Related U.S. Application Data

(60) Provisional application No. 61/258,354, filed on Nov. 5, 2009, provisional application No. 61/265,491, filed on Dec. 1, 2009.

(51) Int. Cl.
*G01F 11/10* (2006.01)
*G01F 11/20* (2006.01)

(52) U.S. Cl.
CPC ..................... *G01F 11/20* (2013.01)
USPC ....... 222/368; 222/153.13; 222/363; 222/542

(58) Field of Classification Search
CPC ......... G01F 11/18; G01F 11/22; G01F 11/44; G01F 13/001; G01F 11/00; G01F 11/20; G01F 11/261; G01F 11/263; G01F 13/005; G01F 23/261; B65B 1/366; B65B 1/36; B65B 1/16; B65B 1/385; B65B 37/20; B65B 29/02; B65B 1/10; B65B 31/02; B65B 31/047; B65B 37/02; B65B 37/08; B65B 37/18; B65B 39/02
USPC .............. 222/359, 368, 153.01, 71, 339, 425, 222/441, 542, 183, 538, 304, 153.15, 363, 222/367; 137/15.18, 599.13, 637; 119/57.8; 251/315.01
See application file for complete search history.

(56) References Cited

U.S. PATENT DOCUMENTS

| | | | | |
|---|---|---|---|---|
| 3,204,833 A | * | 9/1965 | Weitzner | 222/355 |
| 3,463,448 A | * | 8/1969 | Piccardo | 251/159 |
| 4,019,660 A | * | 4/1977 | Berkey | 222/304 |
| 4,383,545 A | * | 5/1983 | Becker | 137/204 |
| 4,473,092 A | * | 9/1984 | Becker | 137/203 |
| 4,828,143 A | * | 5/1989 | Jennings | 221/266 |
| 5,292,037 A | * | 3/1994 | Held | 222/339 |
| 5,392,037 A | * | 2/1995 | Kato | 341/67 |
| 5,694,794 A | * | 12/1997 | Jerg et al. | 68/17 R |
| 5,823,401 A | * | 10/1998 | Zgoda | 222/333 |
| 5,927,558 A | * | 7/1999 | Bruce | 222/185.1 |
| 6,189,742 B1 | * | 2/2001 | Thomson et al. | 222/339 |

(Continued)

*Primary Examiner* — Frederick C Nicolas
*Assistant Examiner* — Bob Zadeh
(74) *Attorney, Agent, or Firm* — Dinsmore & Shohl LLP

(57) ABSTRACT

A device for dispensing a metered amount of powdered, granular liquid or related fluent materials and a method of dispensing a fluent material such that a release of excess material beyond the metered amount is inhibited. The dispenser includes a sealing arrangement to effect such inhibiting, as well as to reduce moisture-based contamination of the material stored within the dispenser. Optional features may include various seal configurations and numbers, removable top and bottom caps that both may have a locking mechanism. The dispenser may be configured as a disposable hand-held device such that, after depletion of the fluent material contents arising out of a multiplicity of uses, it can be thrown away.

10 Claims, 8 Drawing Sheets

(56) References Cited

U.S. PATENT DOCUMENTS

| | | | |
|---|---|---|---|
| 6,338,423 B1 * | 1/2002 | Polon | 222/368 |
| 6,766,924 B1 * | 7/2004 | Ophardt et al. | 222/368 |
| 6,782,692 B2 * | 8/2004 | Hodinot et al. | 60/39.281 |
| 7,032,787 B2 * | 4/2006 | Sherk et al. | 222/441 |
| 7,051,996 B2 * | 5/2006 | Grau | 251/309 |
| 8,439,231 B2 * | 5/2013 | Schroedter | 222/153.13 |
| 2003/0005966 A1 * | 1/2003 | Johann | 137/625.47 |

* cited by examiner

SEALED DISPENSER FOR METERED FLUENT MATERIALS

This application claims the benefit of U.S. Provisional Application No. 61/258,354 filed on Nov. 5, 2009, as well as on U.S. Provisional Application No. 61/265,491 filed on Dec. 1, 2009.

BACKGROUND OF THE INVENTION

The present invention relates generally to a device for dispensing a metered amount of fluent material, and more particularly to a sealed, dispenser for consistent dosing of the metered fluent material.

Free-flowing powdered and granular substances (alternatively referred to as part of a larger class known as fluent materials) are used extensively for myriad applications, with a significant segment of the fluent material market relating to food, medicines and dietary supplements, the latter of which may include, among other things, vitamins and related digestible health-related products. These materials are often used to improve the health or general nutritional levels of humans or animals. Frequently, such fluent materials are mixed in with palatability enhancers to reduce or eliminate the often objectionable taste experience associated with the fluent material, and thus increase the likelihood that the material actually reaches its destination. In any event, it is desirable to be able to effect a consistent, repeatable quantity of a fluent material into a food or related nutritional supply. Devices, such as that depicted in U.S. Pat. No. 7,032,787, the entirety of which is incorporated herein by reference, may be used to achieve such purpose.

One area where consistent, rapid and repeatable dosing of such fluent materials into a feed supply is especially beneficial relates to both small and large domesticated animals, such as dogs, cats and horses, as well as to livestock. A particularly important consideration in a dispenser capable of holding larger quantities of product, as well as for situations where larger quantities are being dispensed in a single application (such as with horses and other large animals) is how to maintain the integrity of the fluent material while being stored within the dispenser, as well as how to ensure that the material is not prematurely lost to spillage, leakage, overflow or the like. For example, a dispenser that remains in relatively close proximity to the animals (such as in a stable, barn or related housing structure) for ease of access may be subject to ambient environments, with its attendant swings in temperature, humidity or the like. In such a circumstance, it would be beneficial for the dispenser to be well sealed to prevent moisture buildup and concomitant agglomeration of the fluent material contained inside. In addition, enhanced sealing would be beneficial in both avoiding intentional or accidental spillage as well as reducing the potential for other forms of product contamination due to inadvertent or intentional exposure. Moreover, it should not be cost-prohibitive to achieve such dispenser integrity, as during the course of normal use, such dispensers may become damaged or lost. Related environmental issues may also exist for household applications, where dogs, cats and other animals could benefit form pure, untainted product.

SUMMARY OF THE INVENTION

The present invention provides an inexpensive, simple-to-use device such that allows consistent, repeatable quantities of the fluent material to be dispensed by an untrained operator. In the present context, the term "fluent material" such as that which may be stored in and dispensed from the various embodiments of the dispenser of the present invention includes, in addition to such material in powdered or granular form, liquids. Sealing inhibits leakage, blow-through or related inadvertent discharge of the fluent material to ensure that the amount discharged accurately reflects the metered quantity dictated by the size of a compartment that cooperates with the sealing. Likewise, the sealing reduces the likelihood that ambient moisture (whether as water or airborne humidity) will permeate the stored fluent material or moisture-sensitive components within the dispenser. Such sealing, along with metered dispensing of powdered, granular or related fluent material, allows the various embodiments of the present invention to form an integrated package with the dispensable product. In addition to enhanced ease of use, such integrated configuration allows for such a dispenser to be either reusable or disposable.

According to an aspect of the present invention, a dispenser is disclosed that is made up of a reservoir to contain the fluent material, and a dispensing assembly with a sealing arrangement such that the dispensing assembly is fluidly cooperative with the reservoir while also possessing enhanced leakage-preventing and moisture barrier properties. In a first operating condition, a rotating valve permits a metered portion of the fluent material to be accepted by the dispensing assembly from the reservoir, while in a second operating condition, the valve permits the dispensing assembly to discharge the metered portion from the dispenser while inhibiting additional fluent material that is not part of the metered portion from escaping.

Optionally, the metered portion is defined by a predetermined volumetric capacity formed in the rotating valve. In this way, a substantially consistent quantity of the fluent material is deposited into the valve from the reservoir or other storage compartment such that upon actuation of the valve, the metered portion may be ejected or otherwise dispensed from the dispenser. In another option, the sealing arrangement includes one or more seals placed between the rotating valve and a discharge flowpath formed around the valve. In a more particular form, a tandem seal set is placed along the discharge flowpath, where even more particularly, a first seal of the tandem seals is fluidly upstream of a second seal, such fluidly upstream being in reference to the direction of normal dispensing flow of the fluent material. In the tandem seal configuration, the first seal defines a generally planar oval shape (specifically, a planar o-ring) when placed against the rotating valve, while the second seal defines an oval shape with an undulation (for example, an anticline or syncline) that defines a generally non-planar profile when placed against the rotating valve. In another option, a third seal may be added that is spaced fluidly between the tandem seals and a point of discharge of the fluent material from the dispenser. In yet another option, a single seal may be used instead of the tandem seals; such a seal may be a generally conformal seal placed along a discharge flowpath formed around the rotating valve. In the present context, a seal is considered conformal when it's shape both tracks the shape of the surface to which it is attached and doesn't significantly alter the shape of profile of such surface. More particularly, the conformal seal may have a substantially rectangular-shaped cross-sectional profile, where such rectangular shape is possessive on an aspect ratio such that the width is significantly greater than its height. In another form, the singular seal may be made from an irregular shape. In the present context, an irregular shape is one that is other than a substantially cylindrical, square or related rectangular shape. It will be understood that an alternative embodiment of the invention may include such an irregular-shaped seal as one of the tandem seals should the need arise.

Preferably, a portion of the sealing arrangement performs the inhibiting action between the reservoir and valve, while in another, it can be used to inhibit the introduction of ambient environment moisture from entering at least one of the reservoir and dispensing assembly. In another optional form, the sealing arrangement is configured such that a substantial entirety of an interfacial region or surface between the reservoir and the valve is protected by the sealing arrangement. By having the operator avoid all contact with the fluent material contents, the risk of contamination to the contents is greatly reduced. Furthermore, by including a locking mechanism into the dispenser, the chances of inadvertent or intentional misuse are reduced. In another option, the sealing arrangement may be made up of multiple seals.

In another option, the rotating valve is spring-biased to the first operating condition. Likewise, a dial, pushbutton or related actuation means may be coupled to the rotating valve such that upon rotation of the dial or other actuation means by a user, the rotating valve overcomes the spring bias to cause the dispenser to go from the first operating condition to the second operating condition. The dial may be placed within a recess formed in an outer housing portion of the dispenser so that it doesn't project in a way hat would make it difficult to slide a bottom cap or related generally conformal cover device. In addition, such a cover can be used to provide a locking assembly, mechanism or related feature that limits access to the dial to avoid inadvertent discharge of the fluent material contained within the dispenser. In addition to the bottom cap configured to engage the dispensing assembly and a discharge aperture formed therein, the dispenser may likewise include a top cap configured to engage the reservoir such that once the fluent material has been placed within the reservoir, the cover effects permanent closure of the aperture. Furthermore, the bottom cap is configured such that it couples with the dispensing assembly to cover a dial used to actuate said rotating valve and a discharge aperture that is fluidly cooperative with the dispensing assembly. More particularly, the bottom cap includes a closure detent that can be inserted into the discharge aperture to additionally prevent fluent material leakage out of, as well as moisture permeation into, the dispensing assembly.

In yet another option, an interface formed between one or both of (a) the top cap and the body and (b) the bottom cap and the dispensing assembly may have a seal (such as a ring, sheet or other form) to further enhance sealing; such supplemental sealing is particularly valuable as a moisture barrier, liquid water barrier or (in the case of the top cap and reservoir interface) a barrier against the escape of the fluent material when such material is in a liquid form. Such an interface (whether with or without the supplemental sealing) may further include a locking assembly to minimize the risk of decoupling of the cover from its respective engaging part of the dispenser.

Other options may also be contemplated, including having the dispenser be made of predominantly plastic construction. In the present context, the dispenser is "predominantly" plastic in that the bulk of the housing making up its structure is plastic, while it will recognized by those skilled in the art that discrete components, such as the biasing spring and pin making up the hinge, could be other materials, such as metal. At least one portion of the reservoir that is used to store the fluent material may include visual indicia of an amount of fluent material remaining. In one form, such indicia may include a transparent plastic body, or other means to allow a user to peer inside. Likewise, labels (for identification of the fluent material product contained within the dispenser) can be adhered to the dispenser, and may include viewing ports to achieve protection against the light while still providing visual identification of the amount of fluent material remaining.

According to another aspect of the present invention, a fluent material dispenser is disclosed that includes a reservoir configured to contain a fluent material, and a dispensing assembly fluidly cooperative with the reservoir. The dispensing assembly includes tandem seals placed along a fluent material flowpath formed about a rotating valve such that in a first operating condition, the rotating valve is in contact with the tandem seals to permit a metered portion of the fluent material to be accepted from the reservoir, while in a second operating condition, the rotating valve permits the dispensing assembly to discharge the metered portion of the fluent material from the dispenser. The tandem seals cooperate with the valve and other surfaces that form the fluent material flowpath such that both of the first and second operating conditions inhibit the escape of any excess fluent material that may come from the reservoir. In the present context, excess fluent material is that which would result in more fluent material being discharged than that making up the metered portion.

According to still another aspect of the present invention, a method of dispensing a fluent material is disclosed. The method includes configuring a dispenser to have a metered portion of the fluent material disposed in a metering compartment, and moving (such as by rotation) the metering compartment such that the metered portion of the fluent material is ejected from the dispenser along a discharge flowpath. A sealing arrangement present along the discharge flowpath means that the fluent material being discharged engages the sealing arrangement in such a way to inhibit any excess fluent material from the reservoir from being discharged along with the metered portion.

Optionally, the sealing arrangement is made from one or more seals disposed between a rotating valve and the discharge flowpath that is cooperatively formed around the valve. In a more particular form, a plurality seals arranged in tandem form are placed along the discharge flowpath, where even more particularly, one of the tandem seals defines a substantially planar o-ring profile when placed in contact with the rotating valve, while another of the tandem seals defines a substantially nonplanar o-ring profile when placed in contact with the rotating valve.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
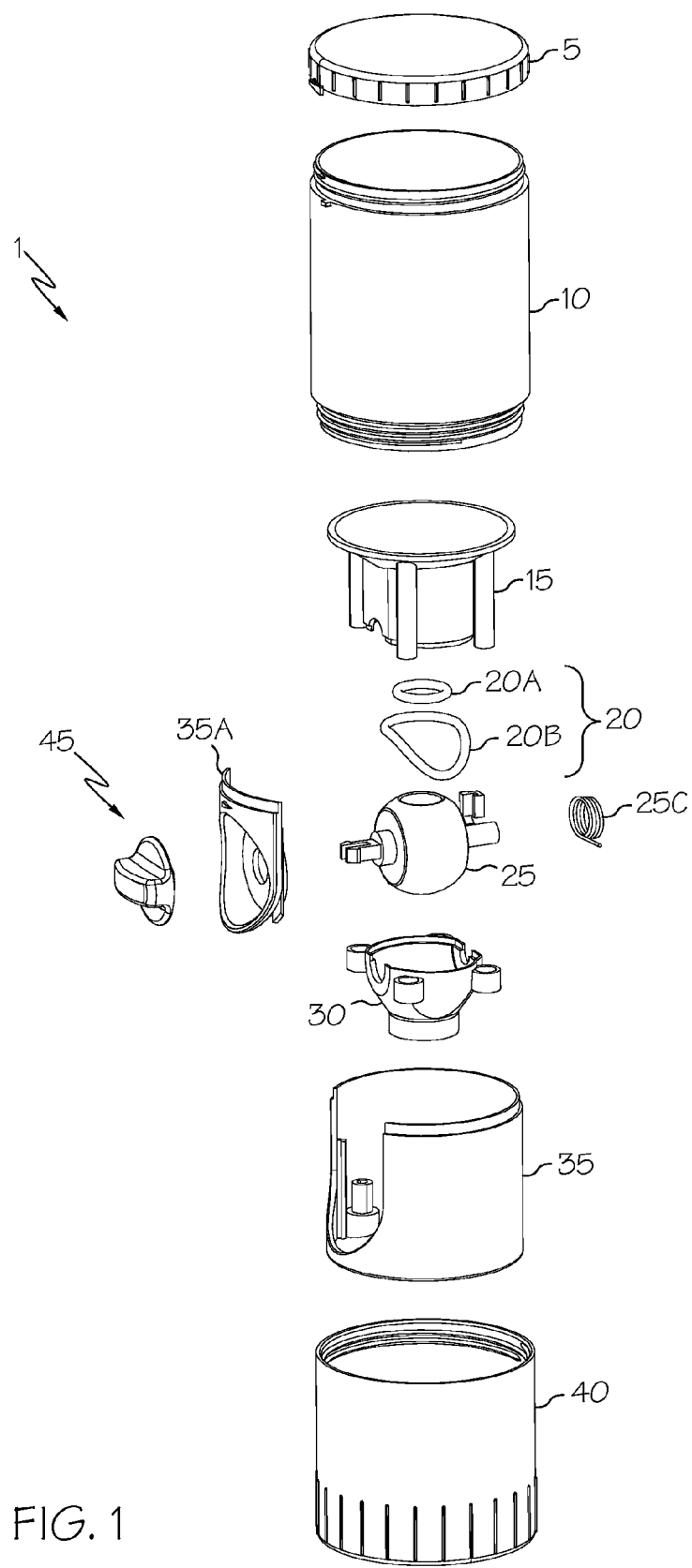
FIG. 1 shows an exploded upper perspective view of a dispenser according to an embodiment of the present invention.
Figure 3:
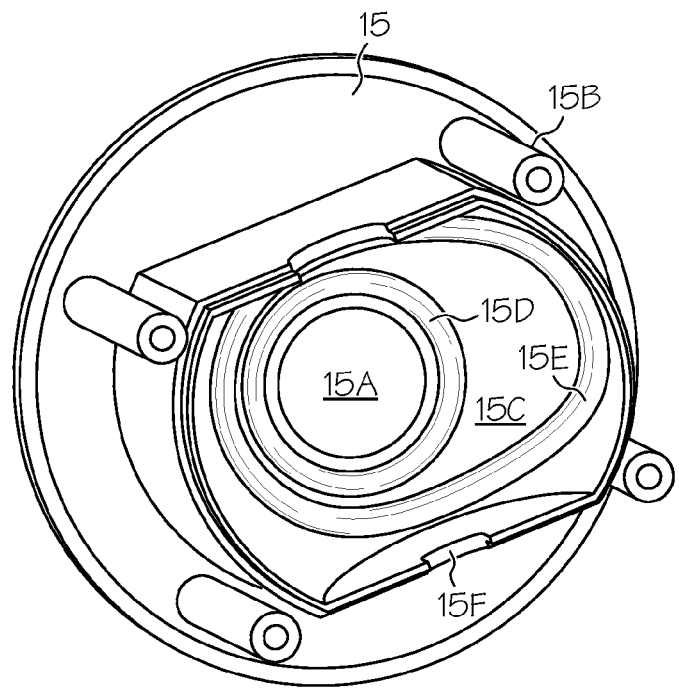
FIG. 3 shows a lower perspective view of a funnel that forms a part of the dispenser.
Figure 4:
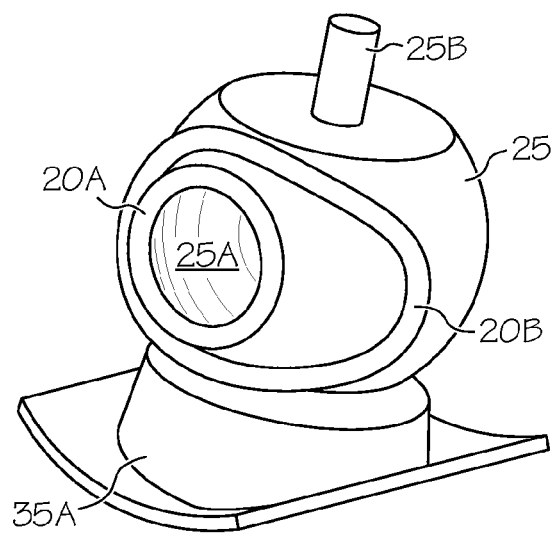
FIG. 4 shows an upper perspective view of a tumbler valve with tandem seals and a dial housing that forms a part of the dispenser.

Referring initially to FIGS. 1, 3 and 4, a dispenser 1 according to an embodiment of the present invention is shown. In its assembled form, the dispenser 1 includes a top cap 5 that is placed on top of a body 10 after a reservoir formed on the inside of body 10 is filled with a fluent material. Body 10 is preferably in the form of a cylinder, and the reservoir defined thereby forms the main fluent material storage area for the dispenser 1. While the size of dispenser 1 may be configured to hold a desirable amount of fluent material, one particular form is sized such that it can be hand-held by an average-sized adult user. A gasket, o-ring or generally planar seal sheet or layer (none of which are shown) may be placed between top cap 5 and the cooperating upper edge of body 10 for enhanced air-tightness, water-tightness or the like. As will be discussed in more detail below, top cap 5 may be attached through various means, such as snap-fitting, screwing or the like. Whether with the sealing effect of the o-ring or without, the secure close-tolerance coupling of body 10 and top cap 5 can act as a barrier against moisture or other foreign matter permeating into the reservoir. Although not shown, various additional shapes of body 10 may be employed, including square, rectangular, oval or irregular shape. In addition, brackets, clips or related mounting structure may be included to hold one or multiple dispensers that are designed in a manner to allow pet food dish or feed bucket to be centered under the dispenser discharge port. One example would be to have a series of dispensers 1 in a side-by-side arrangement that could be mounted via brackets or other fastening means to a wall or other easily-accessible surface. In such an arrangement, while the entirety of the dispensers 1 may no longer be hand-held for dispensing purposes, each individual dispenser 1 may be removed from the arrangement (such as by release through biased spring clips or the like) to result in a hand-held device. In one particular form of such an example, the cabinet can hold one or multiple dispensers within a bracket, clip or other removable mounting scheme such that it allows activation of the dispenser 1 with or without removing the dispenser 1 from a wall, cabinet or related mounting structure.

A lower edge of body 10 is connected to a frame 15 that defines an infundibular upper portion terminating in aperture 15A for gravity-fed receipt of the fluent material from body 10. In a preferred form, the connection of the body 10 and the frame 15 is through ultrasonic welding to promote an air-tight and fluid-tight integral structure. Frame 15 also provides mounting structure in the form of a series of tubular-shaped downward-extending legs 15B, as well as a seating area 15C.

A dispensing assembly made up of a seal arrangement 20, a spherical-shaped tumbler valve 25, a valve housing 30, a base 35 and dial 45 is coupled to frame 15 in order to dispense a metered amount of fluent material from the reservoir formed in body 10. More particularly, seal arrangement 20 is made up of tandem seals 20A and 20B that are sized and shaped to fit within respective seal seats 15D and 15E that are formed in seating area 15C and shown with particularity in FIG. 3. In this way, the tandem seals 20A and 20B can positively register with the respective seal seats 15D and 15E to avoid inadvertent moving and related reduction in sealing. Although the seated fitting arrangement embodiment depicted in the figures is a preferred form, another embodiment may include having the tandem seals 20A and 20B instead be affixed to the surface of the tumbler valve 25, such as through an adhesive or the like. Tumbler valve 25 is placed within the seating area 15C such that the valve's spherical outer surface is in sealing contact with both of tandem seals 20A and 20B while an upward-facing metering compartment 25A formed in tumbler valve 25 is biased to be in fluid communication with aperture 15A of frame 15. Tumbler valve 25 is configured as a rotating valve that is connected by a stem 25B to be movably responsive to a turning motion of dial 45. One portion of a spring (such as the coil spring 25C, shown in FIG. 1) can be placed in cooperation with stem 25B such that upon engagement of another portion of the spring with a suitable structure in base 35, the dial 45 springs back into the biased position to allow the aperture and metering compartment 25A of tumbler valve 25 to be placed in fluid communication with the reservoir through frame aperture 15A in order to accept a new metered quantity of fluent material.

In another form (not shown), a rack-and-pinion arrangement between a push button and a corresponding gear (such as depicted in aforementioned U.S. Pat. No. 7,032,787) could be used in place of dial 45. In a more automated version, a small motor electrically connected to battery power could be used in place of dial 45 to facilitate switching the tumbler valve 25 from a first operating condition (i.e., filling the metering compartment 25A) to a second operation condition where the tumbler valve 25 is rotated to dispense the fluent material contained in metering compartment 25A. In such an automated configuration, a push-button (not shown) similar to that of U.S. Pat. No. 7,032,787 could be used in place of dial 45 such that upon depressing the button, a signal is sent to allow current from the battery to power the motor (which could be a stepper motor, for example) to move an incremental amount (for example, through a full 360° rotation form the at-rest position through dispensing and back to filling in the at-rest position) to achieve the necessary dispensing of the metered amount of fluent material. Such a battery and motor configuration could be placed in an appropriate part of the dispenser 1, such as in the base 35 or frame 15. Of the tandem seals, the uppermost seal 20A is generally circular and planar in shape, such that it resembles an o-ring, while the lowermost seal 20B is formed into a three-dimensional anticline shape. As with many of the other parts that make up dispenser 1, frame 15 may be molded from a plastic material with intricate shapes formed therein. For example, seal seats 15D and 15E are sized and shaped to form ridges along the oval or spherical shaped surface of seating area 15C in order to accommodate the tandem seals 20A and 20B in such a secure way to ensure that the seals remain in place during operation of dispenser 1.

As shown with particularity in FIG. 4 in conjunction with FIG. 1, stem 25B extends from tumbler valve 25 to engage a corresponding set of semicircular stem seats 15F that are formed in valve housing 30 such that an interior volume defined by the clamshell-like attachment of the lower portion of frame 15 to the upper portion of valve housing 30 contains tumbler valve 25 therein. An opposite end of stem 25B acts as a shaft with which to engage dial 45 that is in turn secured to a dial housing 35A that makes up a portion of base 35. In addition to fitting within the seal seats 15D and 15E of frame seating area 15C, both of the tandem seals 20A and 20B laterally straddle the upper surface of tumbler valve 25 about an axis of rotation defined by stem 25B. The planar uppermost seal 20A forms a sealing connection about an aperture formed in tumbler valve 25 that leads to a volumetric opening in the form of a metering compartment 25A that allows a prescribed amount of fluent material to enter from the reservoir in body 10 through the aperture 15A of frame 15. This sealing ensures that in an at-rest (i.e., non-dispensing) condition, stray fluent material that otherwise may be gravity-fed around the tumbler valve 25 is stopped. The lowermost seal 20B acts as a backup to the uppermost seal 20A, as well as provides a more comprehensive sealing during a dispensing operation, as will be discussed in more detail below.

In one form, the tumbler valve 25 can be made from an engineered thermoplastic material, such as polyoxymethylene, which is commonly referred by its trade name, Delrin. Such materials are advantageous in applications that require high stiffness, low friction and excellent dimensional stability. Delrin in particular has been approved by the US Food and Drug Administration for use in the food industry, making it particularly useful for the present dispenser. Many of the remaining parts of dispenser 1 may also be made from a suitable grade of plastic. In fact, construction of the dispenser 1 is such that very few (if any) parts need be made from a metal or other robust material, examples including screws or related fasteners (not shown) and springs (such as that discussed above) that might benefit from being made from a metallic material. In the event that the dispenser 1 is made to be a one-time (i.e., disposable) configuration with recyclability, even the screws and biasing spring 25C may be made from a plastic material. While a preferred shape of tumbler valve 25 is spherical, it will be appreciated by those skilled in the art that other forms, such as cylindrical or other rotatable forms, are also within the scope of the present invention.

In one form, the internal fill volume of the metering compartment 25A is sufficient to hold enough fluent material for numerous dispensings. In one form, for a dispenser 1 capable of holding 85 tablespoons, the height of the dispenser would be about 11.5 to 12.0 inches. Likewise, if the dispenser 1 were about 10.5 inches in height, the fill volume would be about 75 tablespoons. In one form, the present inventors believe that approximately 70 tablespoons may be enough for a two month supply plus a week's worth of doubled dispensing. It will be appreciated that different sizes are within the scope of the present invention, and that such sizes may depend in part on the nature of the material being dispensed, including its shelf-life or related indicia of efficacy. Likewise, the aforementioned heights that correspond to a particular amount of stored fluent material may also be traded off against diametric or circumferential dimensions, such that the dispenser 1 takes on a more squat profile. In configurations where it is important for the dispenser 1 to be hand-held, it is within the scope of the various embodiments of the present invention to be able to trade off the height and width numbers. Furthermore, in situations where particular quantities of a fluent material to be dispensed are desired, (for example, a teaspoon, tablespoon or the like), the tumbler valve 25 and the metering compartment 25A formed therein needs to be a certain size to accommodate such dimensional concerns.

Figure 5A:
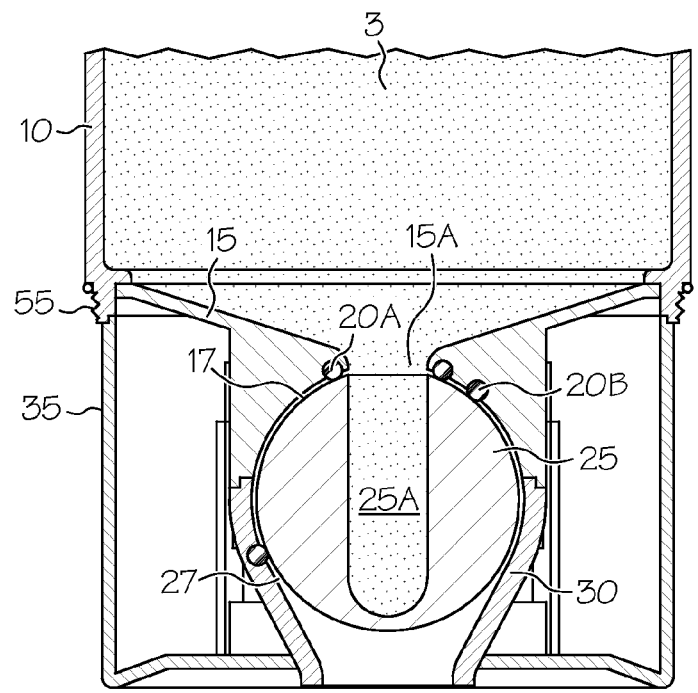
FIGS. 5A through 5C show a rear cutaway view of the dispenser of FIG. 2A, including how the tandem seal arrangement of FIG. 4 maintains fluent material isolation during dispensing through the tumbler valve.
Figure 5B:
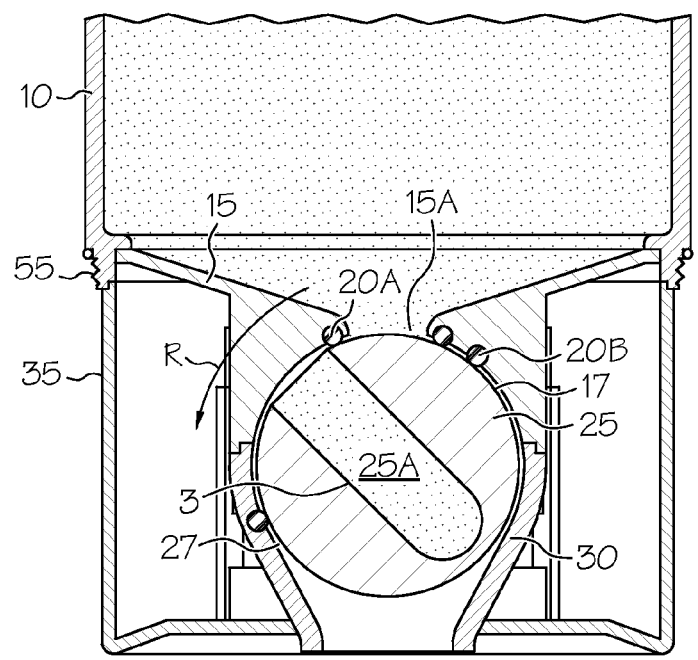
Figure 5C:
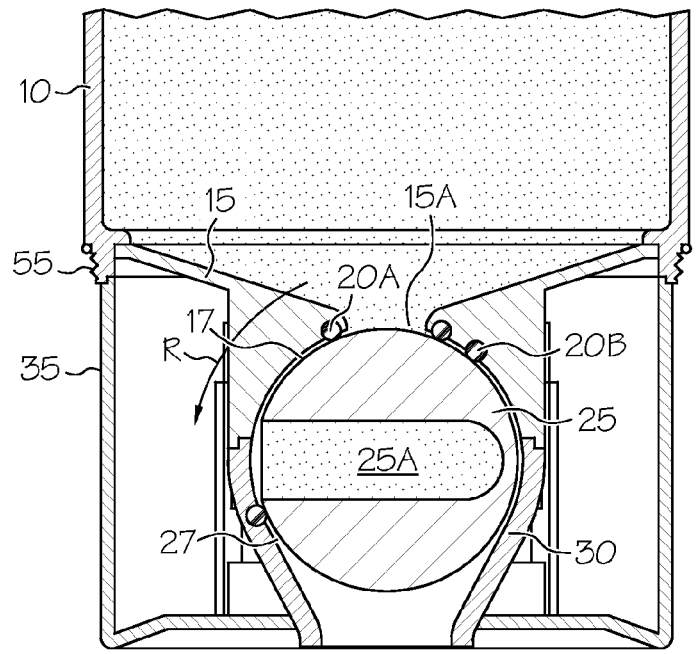

Referring next to FIGS. 5A through 5C, the cooperation between the outer surface of tumbler valve 25, the sealing arrangement 20, the seating area 15C and the inner (or flowpath) wall of valve housing 30 as the tumbler valve 25 rotates from a first mode of operation to a second mode of operation is shown. FIG. 5A shows the dispenser 1 in its at-rest state (also referred to herein as a first operating condition) where the metering compartment 25A of tumbler valve 25 is oriented such that an aperture formed in the valve is face-up and aligned with the aperture 15A that terminates the frustroconical flowpath portion of frame 15 that is secured to the lower edge of body 10. In this way, fluent material 3 resident in body 10 and the flowpath portion of frame 15 fills metering compartment 25A (which may be sized to accommodate an efficacious amount of fluid material 3, such as one teaspoon, one tablespoon or whichever amount is expected to be dispensed per turn of dial 45). Uppermost seal 20A, by virtue of its placement at or near the interface of the flowpath portion of frame 15 and the aperture and metering compartment 25A, substantially inhibits leakage of stray granules, powder or fluid of fluent material 3 along a sliding interface (also referred to herein as a discharge flowpath or leakage flowpath) 17 that forms between tumbler valve 25 and the seating area 15C that defines a flowpath for frame 15 below its aperture 15A. As can be seen in the figures, a comparable interface 27 between tumbler valve 25 and a flowpath region formed in valve housing 30 also possesses a gap; as such, without the more complete sealing produced by sealing arrangement 20 of the present invention, it is foreseeable how leakage of fluent material 3 in excess of the amount in metering compartment 25A could otherwise occur. While the interfaces 17 and 27 may be reduced to the point where the slidingly cooperative surfaces of tumbler valve 25 and the seating area 15C (for interface 17) and tumbler valve 25 and a flowpath region formed in valve housing 30 (for interface 27) are substantially in contact with one another, the present inventors have determined that such a configuration may exacerbate dial-turning difficulties, especially in the case of granular or powered fluent material that may be stuck along such interfacial regions. FIG. 5B shows how the tandem seals 20A and 20B interact with one another, tumbler valve 25 and frame 15 to prevent blow-through or leakage of excess fluent material 3 from the reservoir. In particular, once the metering compartment 25A is first exposed to an interstitial volume between the tumbler valve 25 and the seating area 15C of frame 15 (for example, in a position along rotational path R between that depicted in FIGS. 5A and 5B), the possibility of excess fluent material 3 blow-through is high without the sealing arrangement 20 of the various embodiments of the present invention, especially in cases of a liquid fluent material 3, where the pressurizing effect of all of the fluent material 3 still in the reservoir is sufficient to provide a strong discharge driving force. The cooperation of the tandem seals 20A and 20B is such that any fluent material 3 that bypasses the uppermost seal 20A into the interstitial space (including interface 17) would be stopped by the lowermost seal 20B all the way up through the intermediate rotational stages (such as shown in FIG. 5C) and final discharge that occurs when metering compartment 25A is completely inverted (not shown) such that it opens up to the lower discharge aperture formed in the bottom of valve housing 30.

Figure 8:
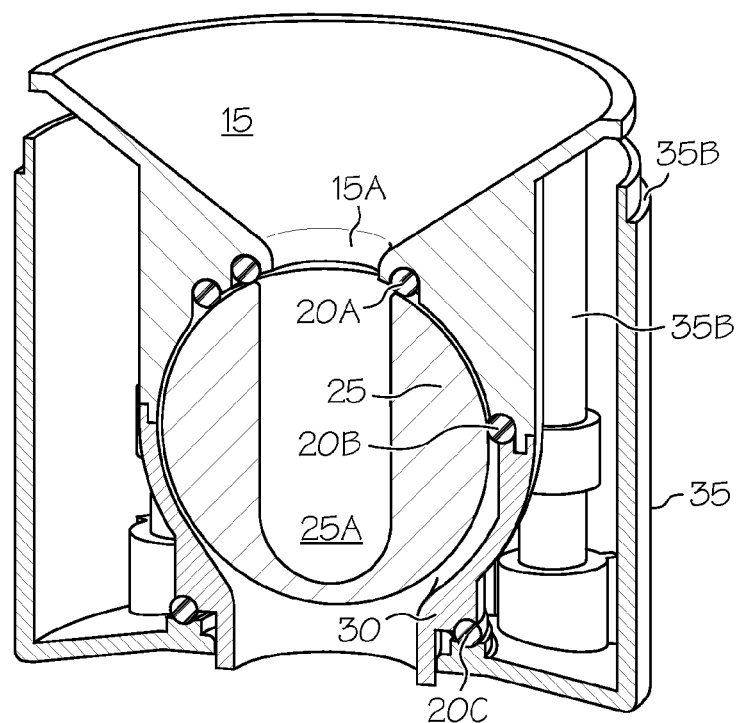
FIG. 8 shows a rear cutaway view of a tumbler valve of yet another alternative embodiment sealing arrangement.

Referring next to FIG. 8, an embodiment generally similar to that of FIGS. 5A through 5C is shown, with the addition of another seal 20C that is used to provide enhanced moisture resistance, particularly as it relates to the reduction in moisture permeation that may otherwise occur in gaps formed between the valve housing 30 and base 35 that may be present due to damage from impact, manufacturing tolerances or the like. When taken in conjunction with the tandem seals 20A and 20B as shown in the figure, seal 20C can be thought of as a third seal. In this regard, the function of the third seal 20C is slightly different than that of tandem seals 20A and 20B in that rather than inhibiting the leakage of excess fluent material from the dispenser 1, its placement is to prevent any liquid or moisture from entering into the dispenser 1. This latter function is useful in that, in addition to minimizing the presence of moisture in the fluent material contained in body 10, it keeps out liquid that would otherwise can get in and be difficult to remove or also possibly rust any potential springs or metal components used as part of the assembly. As stated above, the screws (not shown) can be made from metal or plastic, depending on the need for creating a fully recyclable dispenser 1. Such can be traded off against the tendency of plastic screws to relax over time, as well as the need to avoid rust or other corrosion.

Figure 6:
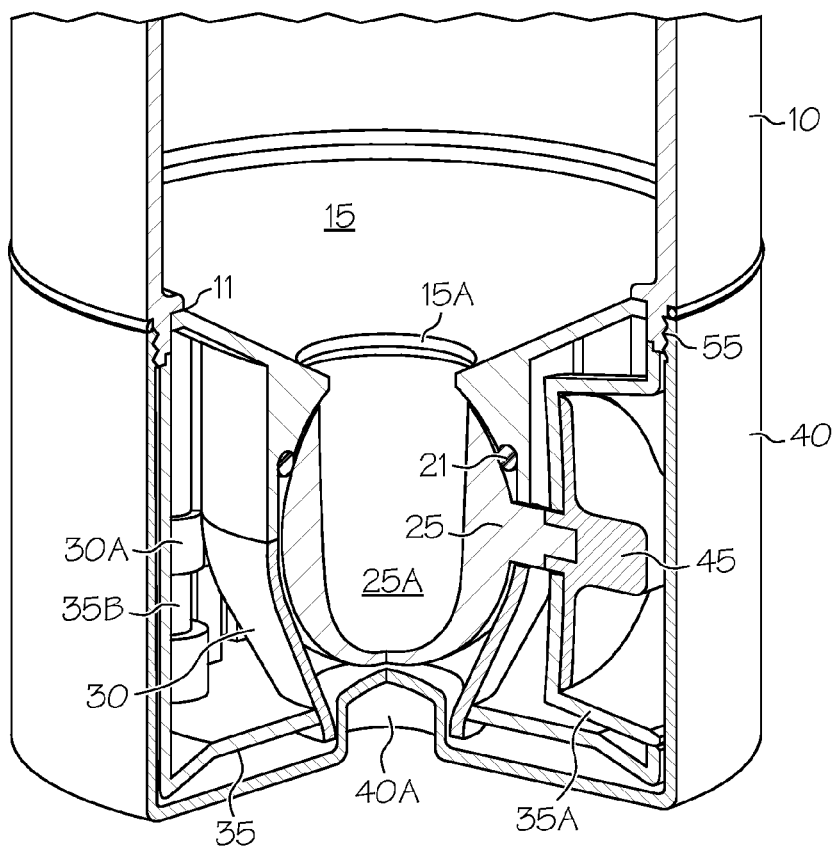
FIG. 6 shows a left front perspective cutaway view of an alternative embodiment sealing arrangement of the dispenser in addition to closure features of the bottom cap.

Referring next to FIG. 6 in conjunction with FIG. 1, the lower portion of dispenser 1 that defines a dispensing assembly is shown in a cutaway view. As mentioned above, the dispensing assembly is made up of seal arrangement 20 (presently shown as a single seal 21), spherical-shaped tumbler valve 25, valve housing 30, base 35 and dial 45 so that base 35 is coupled to frame 15 with the seal 21, tumbler valve 25 and valve housing 30 secured between them (such as through screws that extend from apertures 35C in base 35 and into the tubular upstanding legs 35B and downward-extending frame legs 15B that are integrally-formed as part of frame 15. Bottom cap 40, in addition to being formed as a trough to capture residual fluent material, further includes an upwardly-projecting plug 40A that can be placed in discharge aperture 50 formed in the bottom of base 35 to further inhibit incidental spillage of the fluent material, as well as form a relatively tight fit to inhibit the introduction of moisture into base 35. Ultrasonic welding can produce an integral connection 11 between the lower edge of body 10 and the upper edge of frame 15. Likewise, a threaded connection 55 can be formed between the lower edge of body 10 and the upper edge of bottom cap 40 in a region near the ultrasonic weld.

In yet another alternative sealing arrangement, the single seal 21 of FIG. 6 may be replaced with a composite seal (not shown). In such a case, the composite seal may define a generally cylindrical cross-section in a manner generally similar to the of seal 21, but may be made up of concentric o-rings, where the inner o-ring could be a relatively hard material, while the outer o-ring could be made from a relatively soft material. Such a configuration is later referred to herein as being of an O-shaped variant. A slight variation of the overall cross-sectional appearance of the composite seal is C-shaped so that enough of the more rigid inner o-ring is partially exposed such that an adhesive or other securing means can be used to establish secure connection between the C-shaped seal and either the tumbler valve 25, seating area 15C or valve housing 30. Whether by interference fit, adhesive connection or other such coupling, the integral nature of either of the composite o-ring configurations discussed herein arises out of the two rings being secured such that one is significantly (in the case of the C-shaped variant) or entirely (in the case of the O-shaped variant) around the other.

Figure 2A:
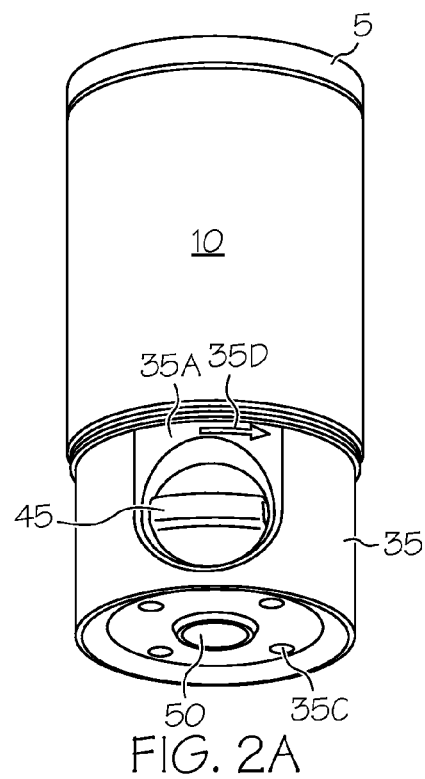
FIG. 2A shows a front elevation view of the dispenser of FIG. 1 in an assembled state, with the bottom cap removed to show the dispensing dial.
Figure 2B:
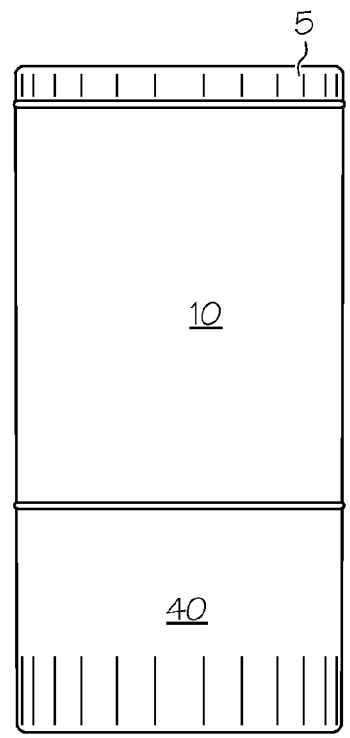
FIG. 2B shows the dispenser of FIG. 2A with the bottom cap in place to hide the dispensing dial.

Referring next to FIGS. 2A and 2B in conjunction with FIG. 1, views of dispenser 1 both without (FIG. 2A) and with (FIG. 2B) of the bottom cap 40 are shown. As mentioned above, when it is desired to dispense a metered portion of the fluent material contained in the reservoir of body 10, the user rotates the dial 45 that is situated in the base 35. To further indicate to a user which direction to turn to dispense the fluent material, an arrow 35D is either formed with or embossed on the dial housing 35A. The bottom cap 40, when screwed onto the body 10, encloses the activating dial 45 so that it is neither accessible nor turnable, thereby enhancing the anti-tampering attributes of dispenser 1. Bottom cap 40 also covers the discharge opening 50 formed in the lower surface of base 35, thus preventing moisture and foreign matter from entering the dispenser 1 when not in use, as well as containing any incidental fluent material that may escape from discharge opening 50. Referring with particularity to FIG. 2A (where the bottom cap 40 is removed), apertures 35C formed in the lower surface of base 35 may lead to upstanding legs 35B that through coextensive cooperation with downward-extending frame legs 15B can threadably hold securing screws or related fasteners. As can be seen, the dial housing 35A that houses the dial 45 and is insertable into a complementary portion of the base 35 is generally flush with the outer peripheral surface thereof; because the base is slightly smaller circumferentially than body 10, the placement of the bottom cap 40 into engagement with the lower edge of body 10 (such as through a threaded, screwing connection as shown) part of the dispenser forms a generally smooth, continuous-circumference outer surface profile along the substantial axial dimension of dispenser 1. As shown with particularity in FIG. 2B, the engagement of bottom cap 40 and the lower edge of body 10 reduces the likelihood of accidental or intentional discharge of fluent material.

Figure 10A:
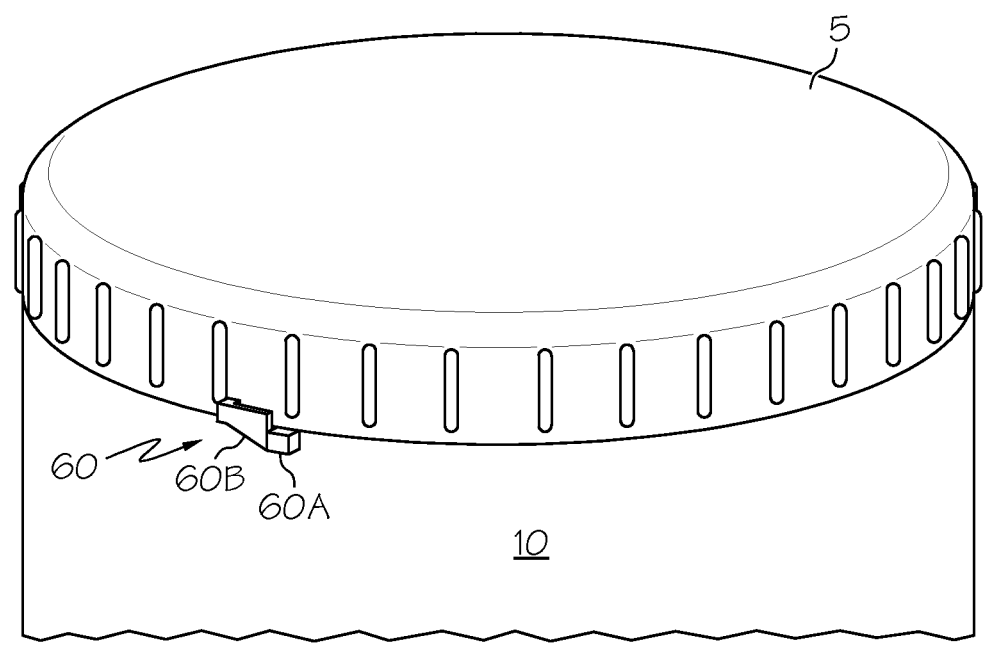
FIG. 10A shows an optional locking assembly of the top cap of FIGS. 2A and 2B.
Figure 10B:
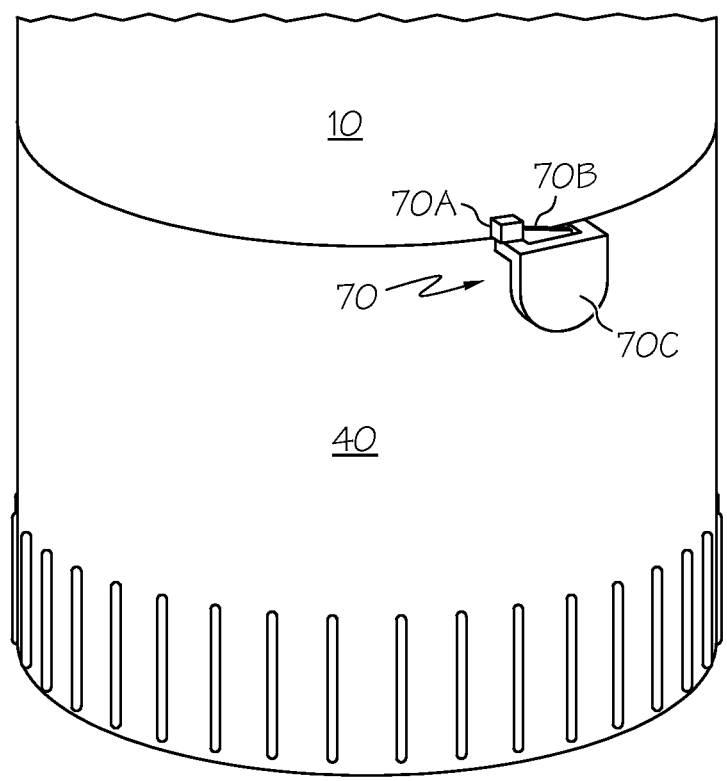
FIG. 10B shows an optional locking assembly of the bottom cap of FIG. 2B.

In one form, dispenser 1 may be made to be reusable or refillable. In such case, top cap 5 may eschew locking features (discussed below) to allow reopening and subsequent access to the reservoir formed as part of body 10. In other cases, where it is desirable to have the dispenser 1 be disposable once empty (such that subsequent access to the reservoir is not required), or in situations where the aforementioned reusable configuration may be in jeopardy of being tampered with (such as being accessible by small children) or exposed to, it may be beneficial to enhance its security. Referring next to FIGS. 10A and 10B, as well as FIG. 2B, limited access and tamper resistance can be enhanced by having at least the top cap 5 (and bottom cap 40, as well) include additional securing features.

Regarding first the upper portion of dispenser 1 as shown in FIG. 10A, after the fluent material is added to the body 10 of dispenser 1, the top cap 5 is applied where, as discussed above, the top cap 5 may be screwed on without locking, such as for a reusable configuration of dispenser 1. One way to augment tamper resistance of top cap 5 is to form a locking connection 60 once the top cap 5 is screwed onto or otherwise mounted to the top edge of body 10. As shown, the locking connection 60 may be in the form of an interference fit through complementary circumferentially-projecting detents formed on each of top cap 5 and body 10. In such a configuration, the general downward travel of top cap 5 as it is screwed onto threads formed at the upper edge of body 10 eventually causes a generally planar surface of the detent portion 60A formed on body 10 to encounter a complementary planar surface of the detent portion 60B on top cap 5 in such a way that they are in facing contact with one another. At least one of the detents (for example, detent 60B as shown) may also include a sloped or faceted surface formed along the points of initial contact to facilitate frictional sliding passage of the two detent portions 60A, 60B with a sufficient degree of elasticity such that upon such passage, at least one of the detent portions 60A, 60B flex, bend or otherwise move slightly to allow passage, and then snap into place along the facingly engages surfaces once the detent portions 60A, 60B pass by one another. An audible snapping or clicking sound may serve as indicia that the top cap 5 and body 10 are locked in place.

Regarding next the lower portion of dispenser 1 as shown in FIG. 10B, the bottom cap 40 is screwed on to the lower edge of body 10 (such as shown in FIG. 6) so that adequate sealing connection between them is formed. As mentioned above, bottom cap 40 (as well as top cap 5) may include an o-ring, gasket, sealing layer or other sealing-enhancing mechanism to further provide air-tight or fluid-tight attributes to dispenser 1, where pressure is imparted to the o-ring or related seal through a tightened screwing motion. Accidental dispensing is avoided with the bottom cap mounted. The bottom cap 40 covers the dial 45 so it is not accessible. Upstanding plug (such as that shown in FIG. 6) can additionally block discharge aperture 50 to prevent inadvertent leakage, while the cup-like structure of bottom cap 40 can also act as a tray to capture stray fluent material residue. Locking connection 70 is configured approximately the same way as locking connection 60, except that in addition to a generally planar surface of the detent portion 70A formed on body 10 to encounter a complementary planar surface of the detent portion 70B, an additional cantilevered portion 70C is coupled to the detent portion 70 so that upon ample applied pressure (such as that from an adult hand), the cantilevered portion 70C may be sufficient to disengage detent portions 70A and 70B from one another. Such a configuration mimics the child-proof features of a medicine bottle or other substance where it is advantageous to reduce the likelihood of child access while still permitting relatively easy adult access. As can be seen in both FIGS. 10A and 10B, caps 5 and 40 may also include ridges around their respective peripheries to facilitate gripping when attempting to secure or remove them. As used herein, the term "cover" may also be used to describe the caps 5 and 40, either collectively or individually.

Figure 7:
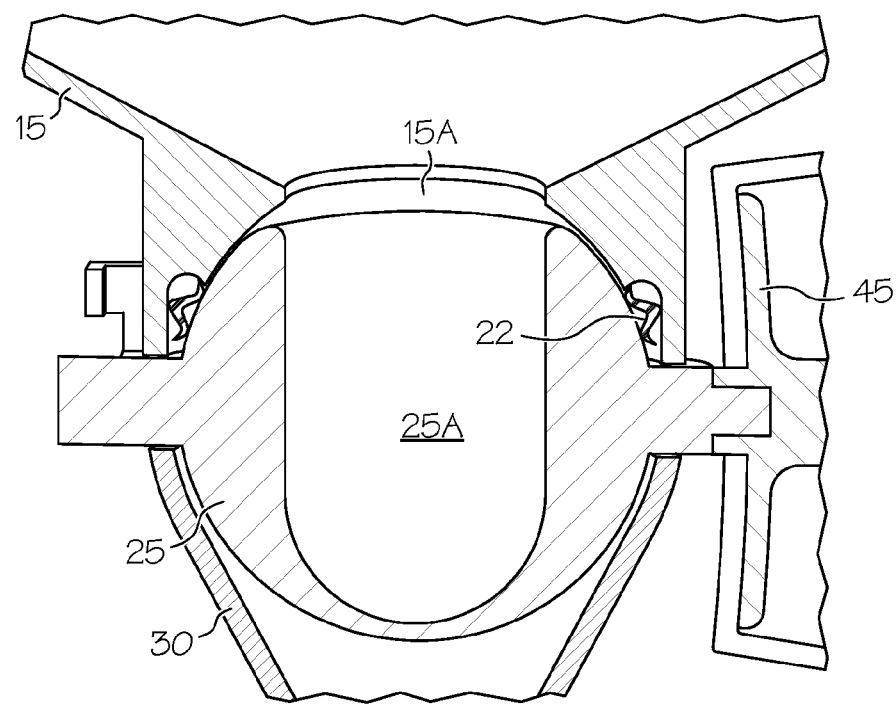
FIG. 7 shows a left side cutaway view of a lower portion of an alternative embodiment sealing arrangement.
Figure 9:
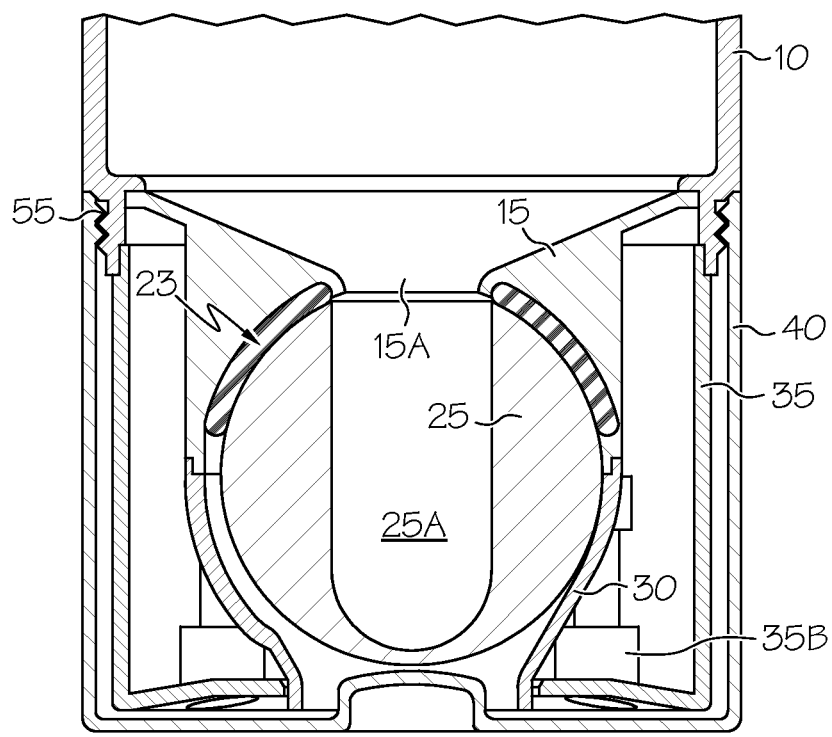
FIG. 9 shows a front cutaway view of a tumbler valve with still another alternative embodiment sealing arrangement.

Referring next to FIGS. 7 and 9, alternative embodiments of a sealing arrangement 20 are shown. Referring with particularity to FIG. 7, a W-shaped seal 22 is shown. Such a seal 22 has a tendency to provide more flex or tolerance to the seals against the tumbler ball, thereby allowing greater ease of rotation, even in situations where the interface (such as interface 17 of FIGS. 5A through 5C) forms little or no gap. Likewise, the sealing arrangement 20 in FIG. 9 is a generally flat rectangular band-shaped seal 23. Such a seal as seal 23 is thin enough and wide enough such that its shape allows it to conformally fit around a latitudinal band of the spherical shaped tumbler valve 25. Such a seal may be cut from a rectangular sheet, membrane or related compliant material such as rubber, plastic or the like. As with the embodiment of FIG. 6, the sealing arrangement 20 of FIGS. 7 and 9 is in the form of a single seal 23.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A fluent material dispenser comprising:
    a reservoir configured to contain a fluent material therein;
    a dispensing assembly fluidly cooperative with said reservoir and comprising a sealing arrangement such that in a first operating condition, a rotating valve in contact with said sealing arrangement permits a metered portion of said fluent material to be accepted by said dispensing assembly from said reservoir, while in a second operating condition, said rotating valve permits said dispensing assembly to discharge said metered portion of said fluent material from said dispenser such that both of said operating conditions inhibit at least a portion of said fluent material remaining in said reservoir from escaping therefrom, said sealing arrangement comprising a tandem seal set disposed between said rotating valve and a discharge flowpath formed therearound such that a first tandem seal of said tandem seal set is placed in selective fluid communication with said metered portion of said fluent material during a portion of a rotational arc formed by rotational movement of said rotating valve relative to said reservoir, and wherein a second tandem seal of said tandem seal set defines an undulated non-planar profile when placed against said rotating valve;
    a top cap configured to engage said reservoir such that once said fluent material has been placed within said reservoir, said top cap effects tamper resistant closure of said aperture; and
    a bottom cap configured to engage said dispensing assembly to cover a dial used to actuate said rotating valve and a discharge aperture that is fluidly cooperative with said dispensing assembly.

2. The dispenser of claim 1, wherein said first of said tandem seal set is fluidly upstream of a second of said tandem seal set.

3. The dispenser of claim 2, wherein said first seal defines a substantially planar oval shape when placed against said rotating valve.

4. The dispenser of claim 2, further comprising a third seal placed between said valve housing and a base defined in said dispensing assembly such that said third seal defines a moisture-resistant barrier therebetween.

5. The dispenser of claim 1, wherein said rotating valve is spring-biased to said first operating condition.

6. The dispenser of claim 5, further comprising a dial coupled to said rotating valve such that upon rotation of said dial by a user, said rotating valve overcomes said spring bias to cause said dispenser to go from said first operating condition to said second operating condition.

7. The dispenser of claim 1, wherein an interface formed between at least one of (a) said top cap and said body and (b) said bottom cap and said dispensing assembly further comprises a seal disposed thereon.

8. The dispenser of claim 1, wherein an interface formed between at least one of (a) said top cap and said body and (b) said bottom cap and said dispensing assembly further comprises a locking assembly between at least one of said caps and a respective one of said body and said dispensing assembly.

9. The dispenser of claim 1, wherein said metered portion is defined by a predetermined volumetric capacity formed in said rotating valve.

10. A fluent material dispenser comprising:
    a reservoir configured to contain a fluent material therein;
    a dispensing assembly fluidly cooperative with said reservoir and comprising tandem seals placed along a flowpath formed about a rotating valve such that in a first operating condition, said rotating valve is in contact with said tandem seals to permit a metered portion of said fluent material to be accepted from said reservoir, while in a second operating condition, said rotating valve permits said dispensing assembly to discharge said metered portion of said fluent material from said dispenser such that both of said operating conditions inhibit at least a portion of said fluent material remaining in said reservoir from escaping therefrom, said tandem seals comprising a first seal defining a substantially planar oval shape disposed between said rotating valve and a discharge flowpath formed therearound such that said first seal is placed in selective fluid communication with said metered portion of said fluent material during a portion of a rotational arc formed by rotational movement of said rotating valve relative to said reservoir, and a second seal defining an undulated oval shape that defines a substantially non-planar profile when placed against said rotating valve;

a top cap configured to engage said reservoir such that once said fluent material has been placed within said reservoir, said top cap effects tamper resistant closure of said aperture; and a bottom cap configured to engage said dispensing assembly to cover a dial used to actuate said rotating valve and a discharge aperture that is fluidly cooperative with said dispensing assembly.

* * * * *